May 15, 1962     L. PAZMANY     3,034,752
FLEXIBLE SUPPORT MEMBER
Filed Dec. 31, 1959

INVENTOR.
LADISLAO PAZMANY

BY Walter J. Jason
Robert O. Richardson
ATTORNEYS

United States Patent Office 3,034,752
Patented May 15, 1962

3,034,752
FLEXIBLE SUPPORT MEMBER
Ladislao Pazmany, San Diego, Calif., assignor to General Dynamics Corporation, a corporation of Delaware
Filed Dec. 31, 1959, Ser. No. 863,214
5 Claims. (Cl. 248—54)

The present invention relates generally to a flexible support member and more particularly to a flexible support member secured to a panel or bulkhead around an opening therein for flexibly supporting tubing, ducting and conduit passing therethrough.

In the construction of aircraft, various systems involving the use of tubing, ducting, conduit and other fluid carriers provide means to conduct pressure and ventilating air, hydraulic fluids, fuels, and other fluids throughout the body and/or wings of the aircraft. Usually the routing of these systems is such that a maximum of unobstructed space is made available for the passengers and cargo. Since the wings usually serve as fuel tanks, the fluid carriers for operation of the various systems are more conveniently located in the leading and trailing edges thereof to avoid the necessity for passing through the fuel tanks. Bulkheads and panels in the fuselage body and ribs and frames in the wing must be provided with openings in the webs thereof in order to permit passage of the fluid carriers therethrough. Although these carriers or ducts are frequently lightly constructed, proper and adequate support is desirable at spaced intervals along the length thereof in order to prevent undue vibration. Such vibration as caused by the engines may possibly result in a failure due to fatigue or otherwise damage the surrounding structure located within close proximity to the carrier. Moreover without such support, the openings in the ribs, frames, bulkheads, panels, etc., through which the carriers pass would necessarily need be of a substantially larger diameter than the diameter of the carrier to provide sufficient vibration clearance therearound. Obviously, openings in the panel web must be reinforced, particularly where the web is adapted for transmitting loads to other structural members. The problem involved in reinforcing the carrier openings in the webs is considerably magnified by the size and number of openings. It is therefore desirable to maintain these openings to a diameter as small as is practical. Where the carrier spans several bays bordered by panels or bulkheads, the web openings should be closely aligned with one another whereby the diameter or size of the openings may be held to a minimum dimension.

Rigid connections such as collars secured to the duct and panel or bulkhead web, although providing the required support and reinforcement around the opening, are frequently found to be unsatisfactory and expensive. Slight irregularities in manufacturing tolerances are greatly magnified over an extended length of carrier ducting which results in considerable difficulty in the alignment of the carrier with the web openings upon installation thereof in a wing or fuselage body.

Accordingly, an object of the present invention is the provision of a flexible support member to effectively dampen vibration forces normally transmitted from the supporting structure to the carrier duct supported thereby.

Another object of this invention is the provision of a flexible support member to accommodate carrier ducts having minor irregularities or external surface deformations.

A further object of this invention is to provide a flexible support member which may be fabricated in shapes to accommodate carrier ducts of various cross-sectional configurations.

A still further object of this invention is to provide a flexible support member wherein the flexibility property thereof may be readily varied in accordance with the requirements of the particular installation.

Another object of this invention is to provide a flexible support member adapted to reduce wear on the carrier duct supported thereby.

Yet another object of this invention is to provide a flexible support member which serves to reinforce the opening in the structure through which the carrier duct passes.

Another object of this invention is to provide a flexible support member adapted to compensate for minor misalignment discrepancies between carrier duct openings in a series of adjacent supporting panels or structures.

Other objects and features of the present invention will be readily apparent to those skilled in the art from the following specification and appended drawings wherein is illustrated a preferred form of the invention, and in which.

Figure 1:
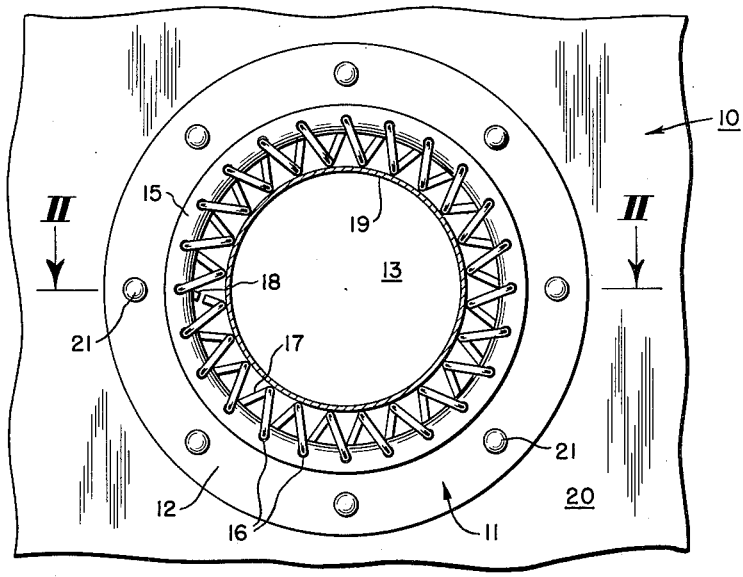
FIGURE 1 is an elevational view of the flexible support member of the present invention shown secured to a panel and supporting a duct.
Figure 3:
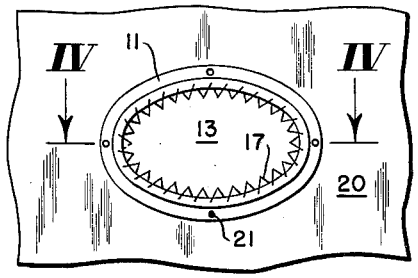
FIGURE 3 is an elevational view similar to FIGURE 1 showing an oval shaped flexible support member for use in supporting carrier ducts at an angle with respect to the supporting structure.
Figure 4:
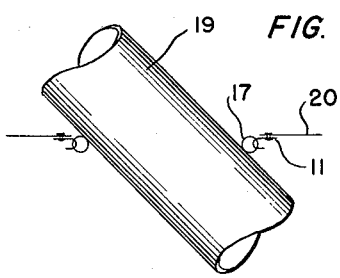
FIGURE 4 is a cross-sectional view taken on the line IV—IV of FIGURE 3 and further showing an angularly disposed carrier duct positioned in the flexible support member of the present invention.

Referring now to the drawings a flexible support member is generally indicated in its entirety by the numeral 10. A collar 11 is preferably fabricated from a light weight metal such as aluminum and is of a general outline configuration corresponding to the cross-sectional shape of the duct supported thereby as it passes through the plane of the collar. As shown in FIGURE 1, this shape is circular while in FIGURE 3 the shape is oval to permit passage of a circular duct through the flexible support member 10 at an angle. It will be apparent that the particular outline shape of collar 11 depends upon the shape of the support panel opening provided and that where ducts of various other cross-sectional configurations are to be supported or angular insertions through the support panel are necessary, the outline of collar 11 may correspondingly vary.

The attaching flange 12 of collar 11 is substantially a flat annular plate. An opening 13 is formed in flange 12 by an extruded portion 14 having a radially extending lip 15 lying in a plane parallel with flange 12 and spaced with respect thereto by extruded portion 14. A plurality of circumferentially spaced holes 16 border about opening 13 extending through lip 15 and flange 12. A flexible element 17 is constructed in the form of a coil spring and is laced through holes 16 in flange 12 and lip 15 of collar 11. Flexible element 17 is assembled to collar 11 by threading or lacing an end 18 thereof through one of the pairs of holes 16 in lip 15 and flange 12 and thereafter rotating or twisting to effect engagement with the remaining holes. Thus it will be seen that flexible element 17 is stabilized and restrained against twisting by engagement with the individual pairs of holes 16 in flange 12 and the spaced lip 15 of collar 11. Flexible element 17 is preferably coated with a wear resistant material such as plastic or rubber (not shown). A duct 19 rests on the individual convolutions of flexible element 17 and is protected against chafing or gouging by the wear resistant coating. This coating further serves to prevent wear of the flexible element 17 in addition to preventing the formation of rust and corrosion.

Figure 2:
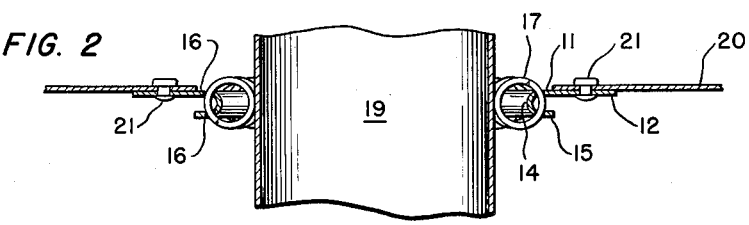
FIGURE 2 is a cross sectional view taken on the line II—II of FIGURE 1.

As shown in FIGURES 1 and 2, flexible support member 10 is secured to a panel 20 as by rivets 21. Panel 20 is representative of a typical bulkhead, frame, rib, etc. as employed in the construction of aircraft. Since panel 20 is usually a fixed portion of the aircraft structure such as a rib in the leading or trailing edge of a wing, duct 19 is merely saddled or flexibly supported at particular points along its length where it intersects the ribs. This construction permits duct 19 to float or move independently of the wing whereby the flexing or bending of the wing, as during flight maneuvers, will not be wholly transmitted from the rib to duct 19. Obviously a certain degree of stiffness or rigidity is desirable at particular points of rib support for duct 19 in order to prevent localized collapse of flexible element 17. In anticipation of such, flexible element 17 may be furnished in various gages or wire sizes as required to effect the desired degree of rigidity. Moreover additional rigidity may be obtained by increasing the number of holes 16 and correspondingly increasing the number of convolutions in flexible element 17.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A flexible support member comprising a collar portion, an extruded portion formed from said collar portion, said extruded portion defining an opening, said collar portion and said extruded portion having circumferentially spaced pairs of holes bordering around said opening, and a flexible element laced through each of said pairs of holes and extending into said opening, the portion of said flexible elements extending into said opening effecting a plurality of radially flexible supporting surfaces.

2. A flexible support member comprising a collar, the inner edge of said collar being U-shaped, said U-shaped edge having a plurality of pairs of holes therethrough, respective holes in each of said pairs of holes being spaced in a direction substantially normal to said edge, and a flexible element laced through said pairs of holes and extending inwardly of said edge, the portion of said flexible element extending inwardly of said edge effecting a plurality of radially flexible supporting surfaces.

3. A flexible support member comprising a collar, the inner edge of said collar being U-shaped, said U-shaped edge having a plurality of holes spaced across and through said U-shaped edge, and a flexible element laced through said holes and extending radially inwardly of said edge, the portion of said flexible element extending inwardly of said edge effecting a plurality of radially flexible supporting surfaces.

4. A flexible support member for supporting a conduit through a panel comprising a panel with an opening therethrough, said panel opening having a U-shaped edge portion with a plurality of holes spaced across and through said U-shaped edge portion, and a coil spring means being laced through said holes and extending radially into said opening for detachably engaging said conduit around the periphery thereof, the portion of said coil spring extending into said opening effecting a plurality of radially flexible conduit support means.

5. A flexible support member for supporting a conduit through a panel comprising a panel with an opening therethrough, said panel opening having a U-shaped edge with a plurality of pairs of holes through said edge, respective holes in each of said pairs of holes being spaced across said U-shaped edge in a direction substantially normal to said panel, and flexible means being supported by said pairs of holes and extending into said opening for detachably supporting a conduit in said opening, the portion of said flexible means extending into said opening effecting a plurality of radially flexible conduit support means.

References Cited in the file of this patent

UNITED STATES PATENTS

| 220,049 | Atwood | Sept. 30, 1879 |
| 623,967 | Barnett | May 2, 1899 |
| 660,631 | Edwards | Oct. 30, 1900 |
| 1,043,530 | Millar | Nov. 5, 1912 |
| 1,952,695 | Webb | Mar. 27, 1934 |
| 2,589,780 | Costello | Mar. 18, 1952 |

FOREIGN PATENTS

| 21,437 | Sweden | Sept. 8, 1905 |